United States Patent [19]
Daugherty, Jr.

[11] Patent Number: 4,747,611
[45] Date of Patent: May 31, 1988

[54] CURB ASCENDING AND DESCENDING WHEELCHAIR

[76] Inventor: Harry K. Daugherty, Jr., 1424 Peacock La., St. Louis, Mo. 63144

[21] Appl. No.: 80,080

[22] Filed: Jul. 31, 1987

[51] Int. Cl.[4] .............. B62B 5/02
[52] U.S. Cl. .............. 280/242 WC; 280/5.2; 280/298; 280/DIG. 10
[58] Field of Search .............. 280/242 WC, 298 WC, 280/5.2, 5.24, 5.26, DIG. 10; 305/2, 60

[56] References Cited

U.S. PATENT DOCUMENTS 3,226,129 12/1965 McKinley .............. 280/5.2
3,499,501 3/1970 Fitzgerald et al. .............. 280/5.2
4,674,757 6/1987 Martin .............. 280/5.26

*Primary Examiner*—John J. Love
*Assistant Examiner*—Donn McGiehan
*Attorney, Agent, or Firm*—Bell, Seltzer, Park & Gibson

[57] ABSTRACT

Selectively operable spiral cam wheels are positioned adjacent and rotate on a common axis with the drive wheels and are attachable to the drive wheels for progressively raising the wheelchair in response to rotation of the drive wheels in one direction and for progressively lowering the wheelchair in response to rotation of the drive wheels in the opposite direction. The spiral cam wheels are also attachable to the wheelchair frame so that the drive wheels are free to be rotated in the normal manner. A lifting arm is pivotally supported at one end on each side of the frame of the wheelchair and the other end is moved by the spiral cam wheels to progressively lift the casters of the wheelchair as the wheelchair is moved toward a curb to be traversed. Embodiments of the wheelchair are disclosed in which the wheelchair is raised as it is moved in a forward direction toward the curb, and in which the wheelchair is raised as it is moved in a rearward direction toward the curb.

18 Claims, 9 Drawing Sheets

FIG-3
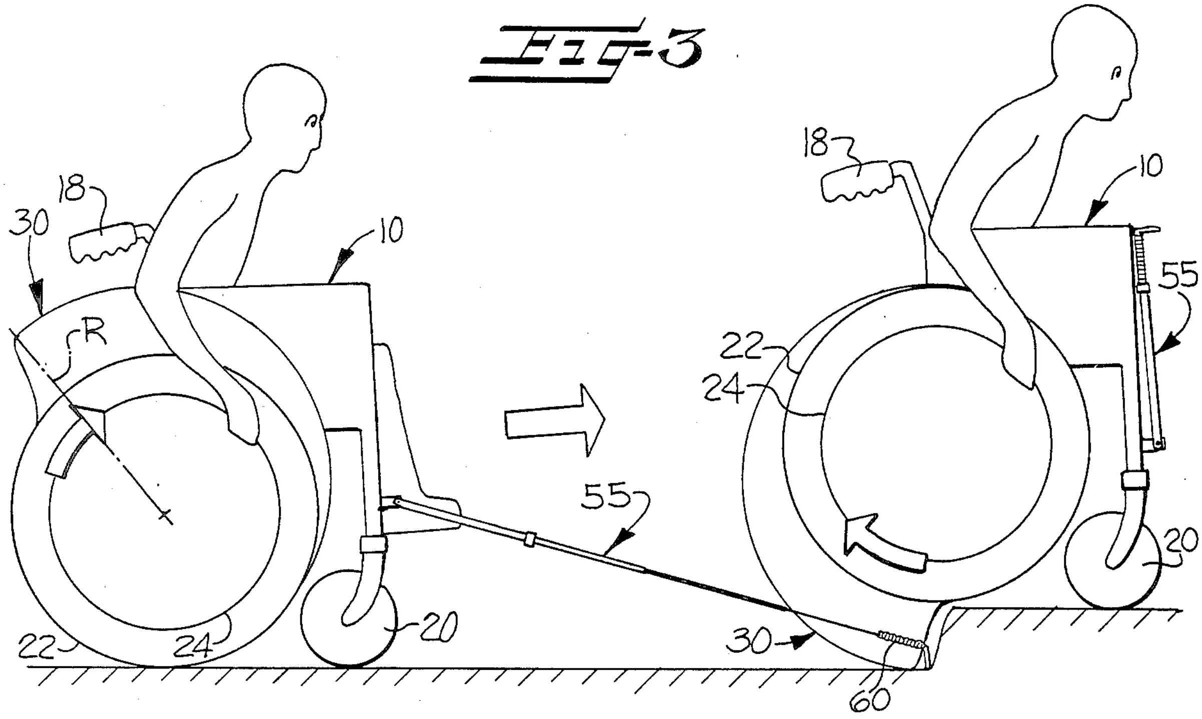
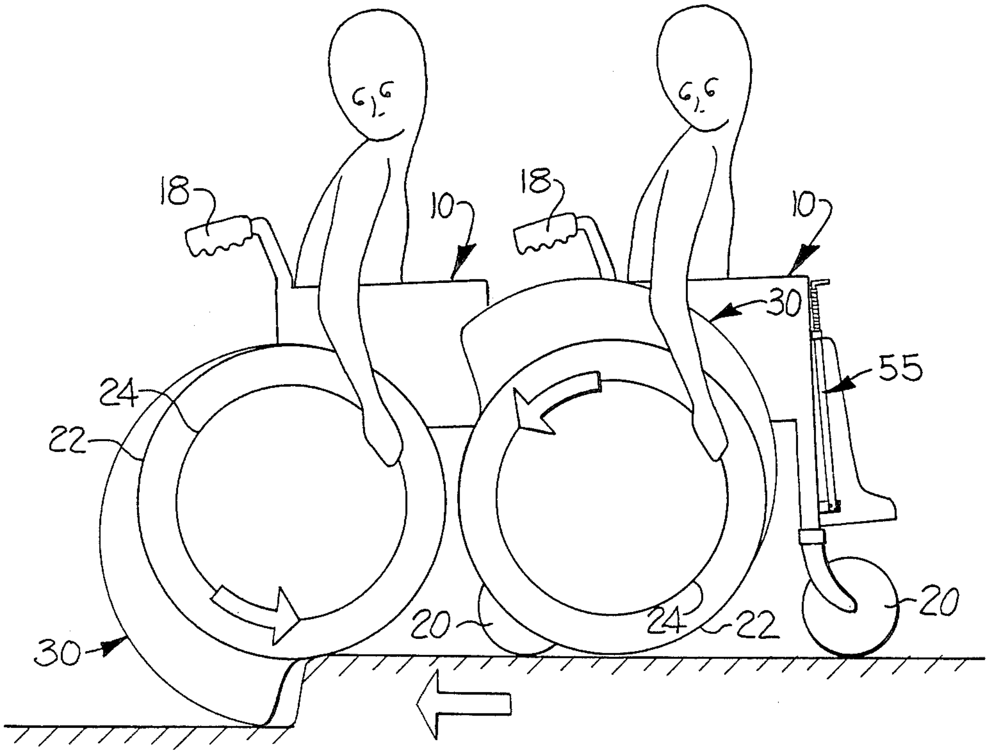
FIG-4

FIG-20
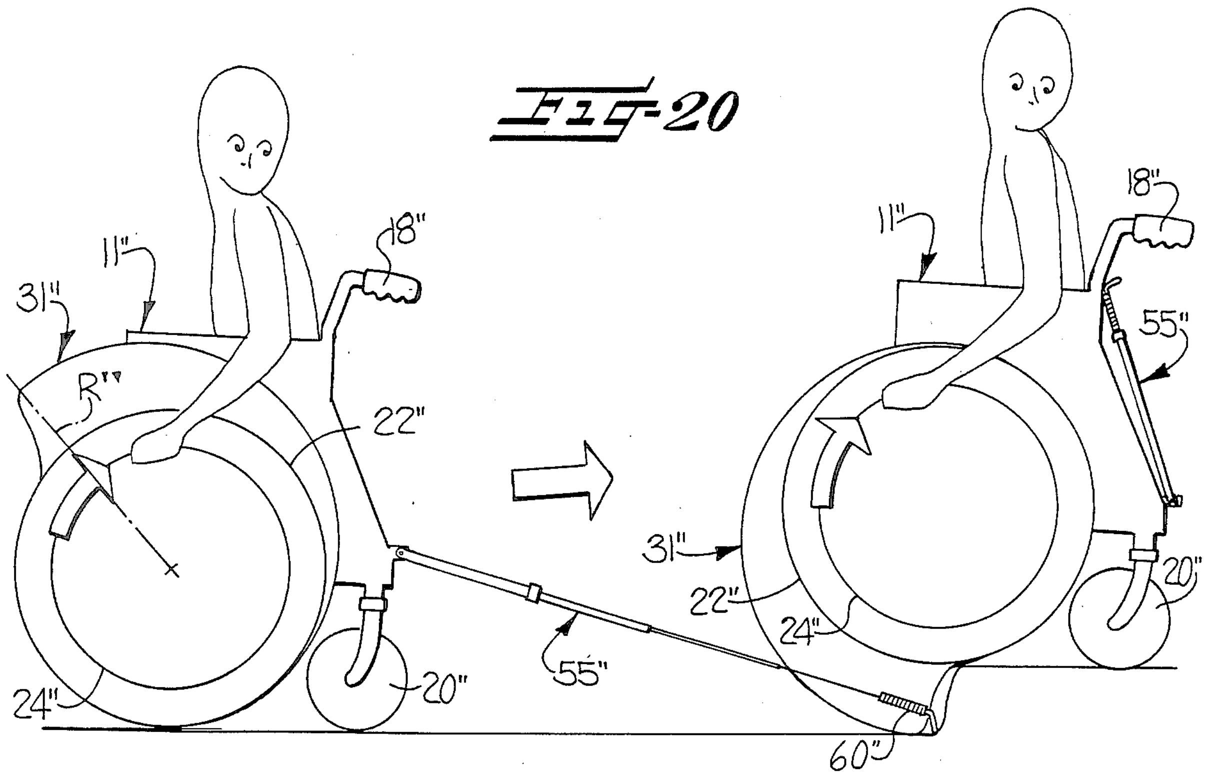
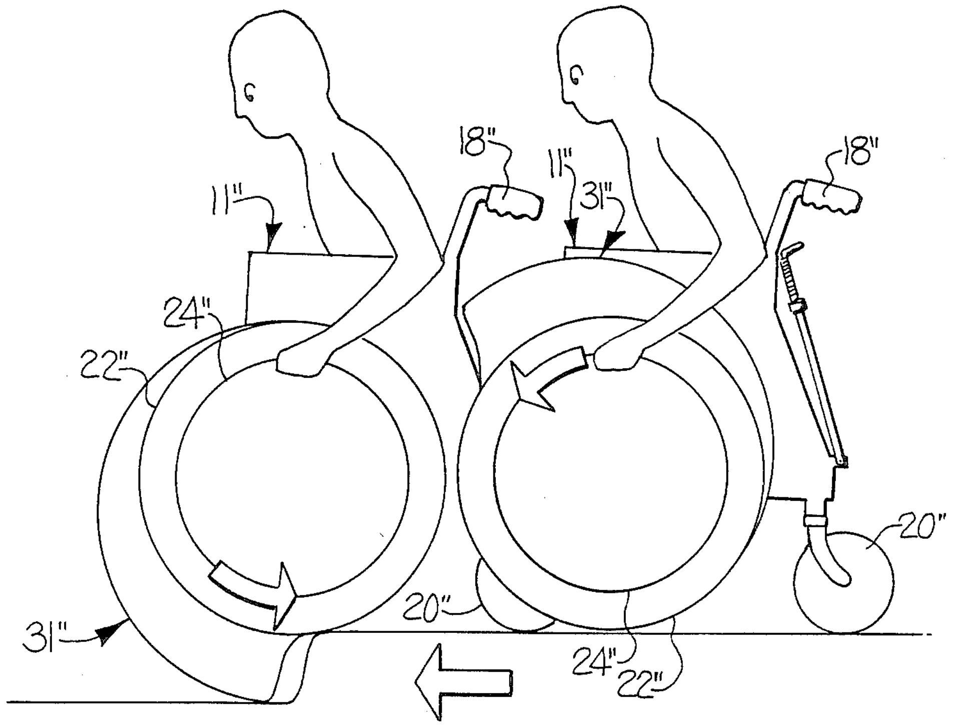
FIG-21

CURB ASCENDING AND DESCENDING WHEELCHAIR

FIELD OF THE INVENTION

This invention relates generally to a curb ascending and descending wheelchair and more particularly to such a wheelchair in which the motive wheels are provided with selectively operable spiral cams supported for selective attachment to the motive wheels for progressively raising the wheelchair in response to rotation of the motive wheels in one direction and for progressively lowering the wheelchair in response to rotation of the motive wheels in the opposite direction.

BACKGROUND OF THE INVENTION

It is difficult for a wheelchair occupant to ascend and descend curbs and the like when moving between the roadway and a sidewalk or the like. In certain cases, where the self-propelled wheelchair occupant possesses great strength in the arms and shoulders, it is possible to "hop" the wheelchair up a curb by leaning rearwardly in the wheelchair to position the small front wheels up onto the curb and then physically rotating the large drive wheels to engage and move up onto the curb elevated surface. However, this "hopping" maneuver of a conventional self-propelled wheelchair requires considerable skill and strength and it is not possible for many wheelchair occupants to maneuver curbs in this manner. In order to prevent tipping the wheelchair over in a rearward direction during this type of curb "hopping" maneuver, U.S. Pat. No. 3,848,883 proposes the addition of anti-tipping wheels positioned rearwardly of the large drive wheels.

It has long been recognized that there is a need for a self-propelled wheelchair for easily ascending and descending curbs and the like. For example, a climbing wheelchair is disclosed in U.S. Pat. No. 3,304,094 which is equipped with elliptical wheels associated with the main drive wheels and fluid pressure operated pistons associated with the front guide wheels for permitting the wheelchair to ascend and descend a curb or the like. However, the pistons are operated by compressed air bottles which must be frequently refilled and the elliptical wheels associated with the main drive wheels require a complicated drive arrangement which adds considerable complexity and cost to the wheelchair.

U.S. Pat. No. 3,573,877 discloses a lever operated main drive wheel lifting plunger for vertical movement downwardly beneath the main drive wheel. This lever operated plunger may be manually lowered to raise the main drive wheel upwardly to the level of the curb but the front guide wheels of the wheelchair must be positioned up on the curb before the main drive wheel is lifted by the lever operated plunger by tilting the wheelchair backward, and this requires more physical effort than is available to many wheelchair occupants.

U.S. Pat. No. 4,455,029 discloses a wheelchair with auxiliary front and rear wheels which are operated by a lever mechanism to lift the wheelchair as it is moved forwardly onto a curb. The lever operated auxiliary lifting wheels of this patent are also difficult to operate and require a complicated linkage between the operating handle and the auxiliary wheels.

SUMMARY OF THE INVENTION

In contrast to the curb ascending and descending wheelchairs of the above-described prior art, the present invention provides a self-propelled or powered wheelchair for ascending and descending a curb in a gradually progressive manner and in response to manual or powered rotation of the motive wheels by the occupant without requiring unusual strength and effort. The curb ascending and descending mechanism may be easily and economically applied to a conventional self-propelled wheelchair and does not limit the mobility of the wheelchair during normal operating conditions.

In accordance with the present invention, a normally inactive spiral cam is rotatable about a common axis with each of the larger diameter motive wheels of the wheelchair. A control means, operable by the occupant, is provided to selectively activate the spiral cams by attaching the same to its respective motive wheel for progressively raising the wheelchair in a gradual manner in response to rotation of the motive wheels in one direction and for progressively lowering the wheelchair in a gradual manner in response to rotational movement of the motive wheels in the opposite direction. The spiral cams also operate to raise the smaller diameter swivel casters of the wheelchair when the spiral cams are attached to and driven by the motive wheels so as to gradually raise and lower the wheelchair in a substantially level or horizontal manner when either ascending or descending a curb or the like.

In one disclosed embodiment of the invention, the spiral cams are supported inside of and closely adjacent the motive wheels so that the overall width of the self-propelled wheelchair is increased only a slight amount. In another disclosed embodiment of the invention, the spiral cams are in alignment with and overlie the motive wheels so that no substantial increase in width of the wheelchair is required. The wheelchair can be of the conventional self-propelled type with relatively large diameter rear motive wheels and relatively small diameter front casters, or the relatively small casters may be positioned at the rear of the wheelchair and the large motive wheels are supported adjacent the front portion of the seat of the occupant.

In each instance, the spiral cams have radii of progressively increasing length. One end portion of the spiral cam has substantially the same radius as the radius of the corresponding main motive wheels and the maximum radius at the other end portion of the spiral cam extending outwardly beyond the radius of the motive wheel a distance which is substantially equivalent to the height of the curb to be ascended and descended. Depending upon the relative position of the mounting of the spiral cams relative to the motive wheels, the wheelchair will ascend a curb while being moved in a forward direction and will descend the curb when being moved in a rearward direction (FIGS. 1–7). Also, the wheelchair can ascend a curb while being moved in a rearward direction and will descend the curb when being moved in a forward direction (FIGS. 18–21).

In each instance, the spiral cams provide a lifting and lowering action to the wheelchair which is similar to placing a long ramp in position in front of a curb and moving a conventional self-propelled wheelchair up and down the ramp. Thus, the spiral cams provide a "rolling ramp" which, when fixed to the motive wheels and rotation is imparted to the motive wheels, imparts a gradual lifting and lowering motion to the wheelchair as it is moved up onto and moved down from a curb or the like.

BRIEF DESCRIPTION OF THE DRAWINGS

Other objects and advantages will appear as the description proceeds when taken in connection with the accompanying drawings, in which

FIG. 3 schematically illustrates the manner in which the spiral cams act as a rolling ramp to lift the wheelchair onto the curb as it is moved forwardly;

FIG. 4 is a view similar to FIG. 3 but illustrating the manner in which the spiral cams form a rolling ramp when the wheelchair is descending from a curb and moving in a rearward direction;

FIGS. 20 and 21 schematically illustrate the respective lifting of the wheelchair when moving rearwardly and the lowering of the wheelchair when moving forwardly.

DESCRIPTION OF THE EMBODIMENT OF FIGS. 1–11

Figure 5:
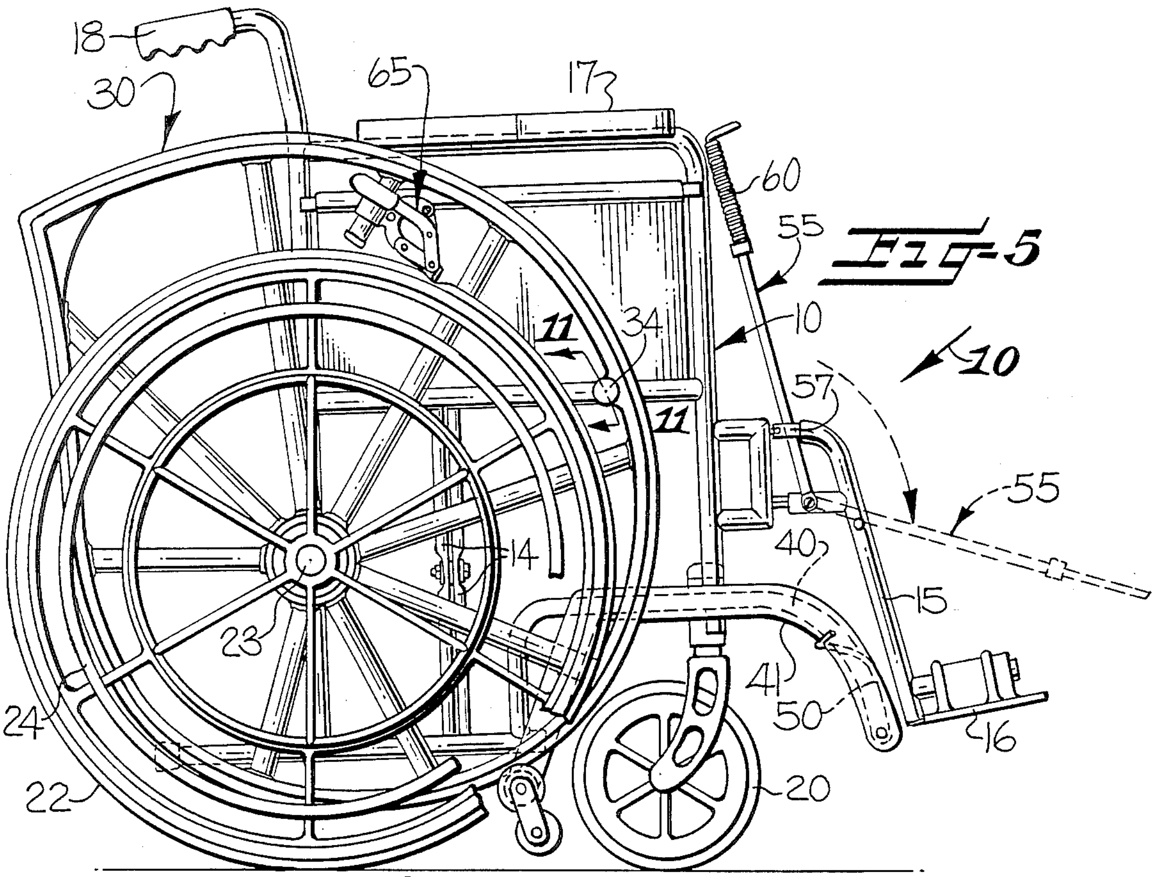
FIG. 5 is a side elevational view of one side of one embodiment of the wheelchair of the present invention.
Figure 6:
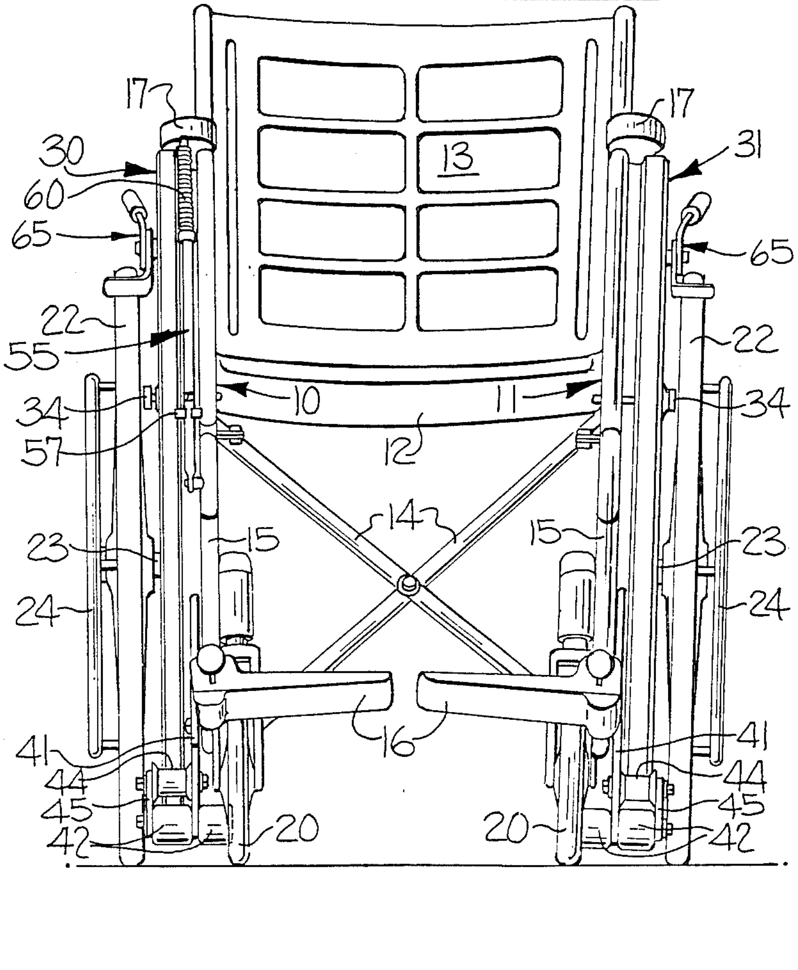
FIG. 6 is a front elevational view of the wheelchair of FIG. 5.

The present invention is disclosed in association with a substantially conventional self-propelled folding or collapsible wheelchair, best shown in FIGS. 5 and 6. The wheelchair includes opposite side frames, broadly indicated at 10, 11 in FIG. 6, and with a flexible seat 12 and flexible back 13 extending therebetween. The side frames 10, 11 are interconnected by crossed brace members 14 (FIG. 6) to permit the opposite side frames 10, 11 to be brought in closely spaced relationship to fold or collapse the wheelchair into a compact unit for storage or transportation. The front lower portions of the front vertical legs of the side frames 10, 11 have the upper ends of foot support frames 15 pivotally connected thereto and the lower ends of which support pivoted footrests 16. The upper horizontal portions of each of the side frames 10, 11 are provided with the usual armrests 17 and the upper end portions of the rear vertical frame members extend in a horizontal and rearward direction to provide handles 18 adapted to be grasped by a person pushing the wheelchair.

The lower end portions of the front vertical frame members of each side frame 10, 11 have relatively small diameter front wheels, illustrated as casters 20, fixed thereto for supporting the front portion of the wheelchair. The rear portion of the wheelchair is supported on relatively large diameter rubber tired main motive or drive wheels 22 rotatably supported on the outer end portions of stub axles 23, the inner ends of which are fixed in the side frames 10, 11. Wheelchair propelling hand rims 24 are fixed to the drive wheels 22 and in outwardly spaced relationship therefrom so that the occupant of the wheelchair can manually rotate the drive wheels 22 in either forward or reverse directions and impart corresponding movement to the wheelchair. If desired, the wheelchair can be provided with rearwardly extending anti-tipping wheels, not shown.

Presently available wheelchairs are usually provided with motive drive wheels 22 ranging from about 22 to 28 inches in diameter and caster wheels 20 ranging from about 8 to 14 inches in diameter. The wheelchair illustrated in the present application is provided with motive drive wheels 22 which are 24 inches in diameter and casters 20 which are 8 inches in diameter.

In accordance with the present invention, a spiral cam, broadly indicated at 30, 31, is supported for rotational movement on the stub axles 23 and between the corresponding drive wheels 22 and the respective side frames 10, 11. Each of the spiral cams 30, 31 is provided with outwardly extending spokes and an outer rubber tired rim with the radial distance from the axle 23 gradually increasing in a counterclockwise direction in FIG. 5 to a maximum length where a sharp step or manually engageable shoulder is provided at the terminal end of the spiral cam, for purposes to be presently described. The maximum radius, indicated by the dash-dot line R in FIG. 3, normally extends upwardly and rearwardly so that the wheelchair is progressively raised as it is moved forwardly toward the curb.

As shown in FIG. 5, approximately 180° of the spiral cam 30 has a radius greater than the radius of the drive wheel 22 so that approximately one-half of the outer peripheral surface of the spiral cam 30 extends outwardly beyond the peripheral surface of the drive wheel 22. The radius of the spiral cam 30 progressively increases in length from a point where it is the same as the radius of the drive wheel 22 to a maximum radius extending outwardly beyond the radius of the drive wheel 22 a distance which is substantially equivalent to the height of the curb to be ascended and descended. The height of the curb may be from about 4 to 7 inches, and is illustrated in the drawings as being 6 inches.

Figure 11:
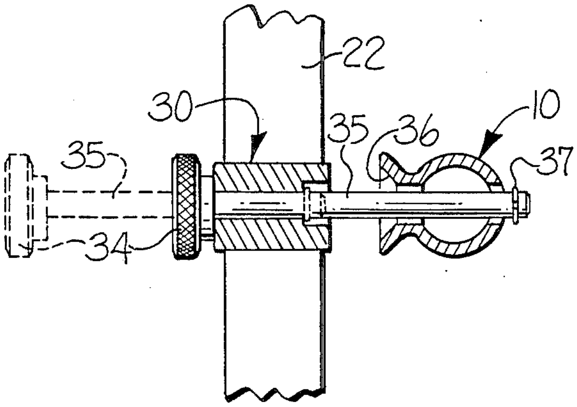
FIG. 11 is an enlarged vertical sectional view taken substantially along the line 11—11 in FIG. 5 and illustrating the locking pin member which is utilized to maintain the cam wheel in a normally inoperative position.
Figure 12:
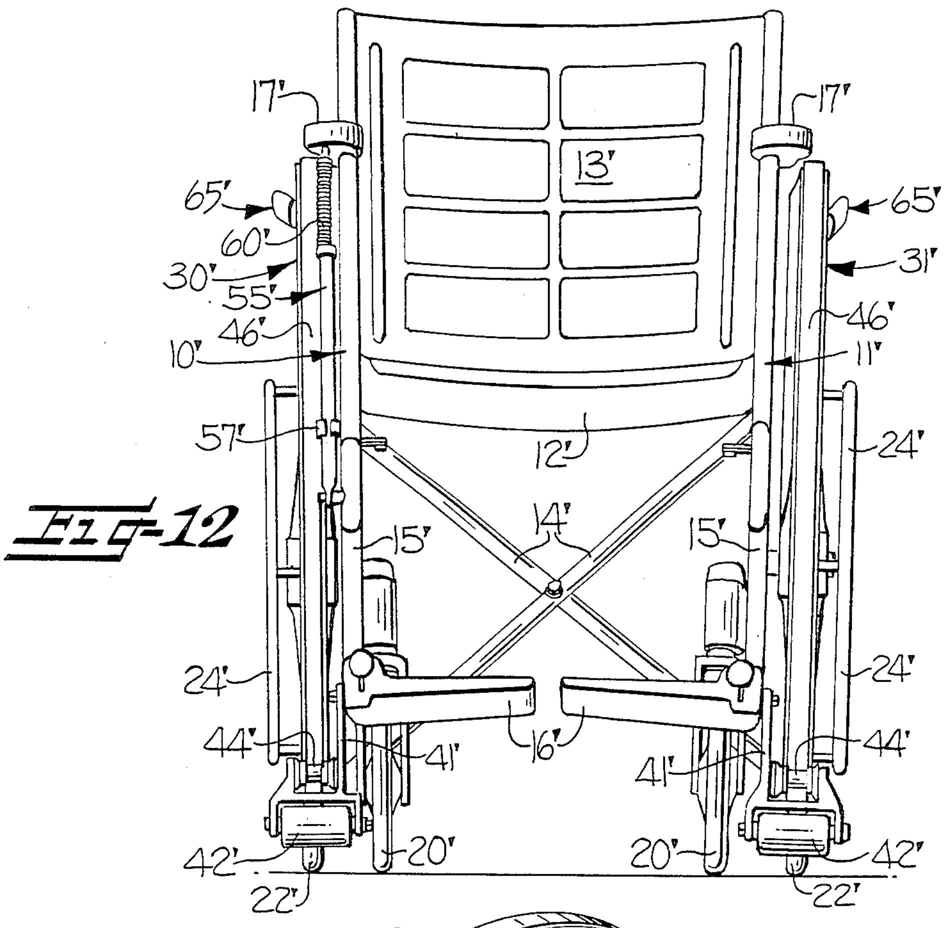
FIG. 12 is a front elevational view of a modified form of wheelchair in which the spiral cams are positioned to overlie the main motive wheels.

The spiral cams 30, 31 are normally maintained in the inoperative or inactive position shown in FIG. 5 by control means operable by the occupant for selectively activating normally inactive spiral cams 30, 31. This control means includes manually operable locking pins 34 (FIGS. 5, 6 and 11). The inner end portion of each of the lock pins 34 is provided with a shaft portion 35 which is adapted to extend through openings in the tubular frame 10 and may be easily guided therethrough by a funnel-shaped guide ring 36 attached thereto. The inner end portion of the shaft 35 is provided with a lock ring 37 to prevent the lock pin 34 from being pulled through and completely out of the spiral cam 30 when the pin 34 is moved to its outermost dotted line position shown in FIG. 11. When moved outwardly to the dotted line position shown in FIG. 11, the spiral cam 30 is released from a fixed relationship with the side frame 10. When the spiral cams 30, 31 are held in inactive or inoperative position by the lock pins 34, in the position illustrated in FIG. 5, they do not interfere with the normal operation of the wheelchair and the drive wheels 22 may be rotated rearwardly and forwardly to maneuver the wheelchair in the usual manner. Thus, the lock pins 34 maintain the spiral cams 30, 31 in the inoperative position, as long as they are in the locking position shown in solid lines in FIG. 11.

Figure 9:
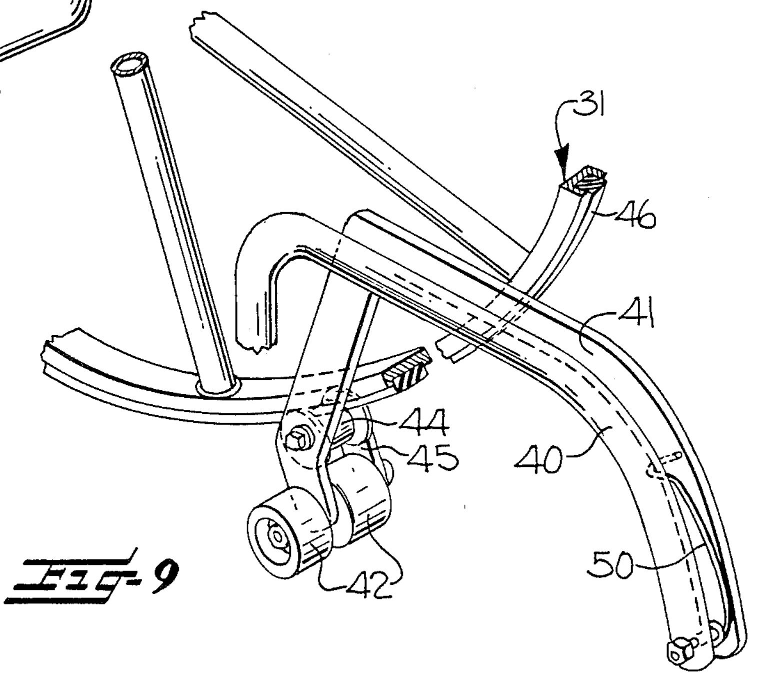
FIG. 9 is a fragmentary isometric view illustrating the lever arm mechanism for lifting and lowering the forward portion of the wheelchair when ascending and descending the curb.

The lower horizontal tubular frame members at the lower sides of each of the side frames 10, 11 are provided with tubular frame members 40 extending forwardly and downwardly with their lower free ends in substantial alignment with the pivoted foot supports 16 (FIGS. 5 and 9). The forward ends of lifting arms 41 are pivotally supported on the lower free ends of the tubular frame members 40 and extend upwardly, rearwardly and then downwardly. The lower free end portions of the lifting arms 41 pivotally support corresponding rollers 42 (FIG. 9). A cam following roller 44 is supported for rotation on the lever 41 and adjacent the rollers 42 and is maintained in spaced relationship above the rollers 42 by a connecting link 45. The cam following roller 44 is maintained in engagement with a rubber tire 46 and the rim on the outer surface of each of the spiral cams 30, 31 by a combination torsion and leaf spring member 50 which is fixed at its lower end and surrounds the pivot pin of the lever arm 41. The upper end of the leaf spring 50 extends upwardly and engages the lower side of the lever arm 41 to thereby urge the lever arm 41 in a clockwise direction in FIGS. 5 and 9.

Figure 10:
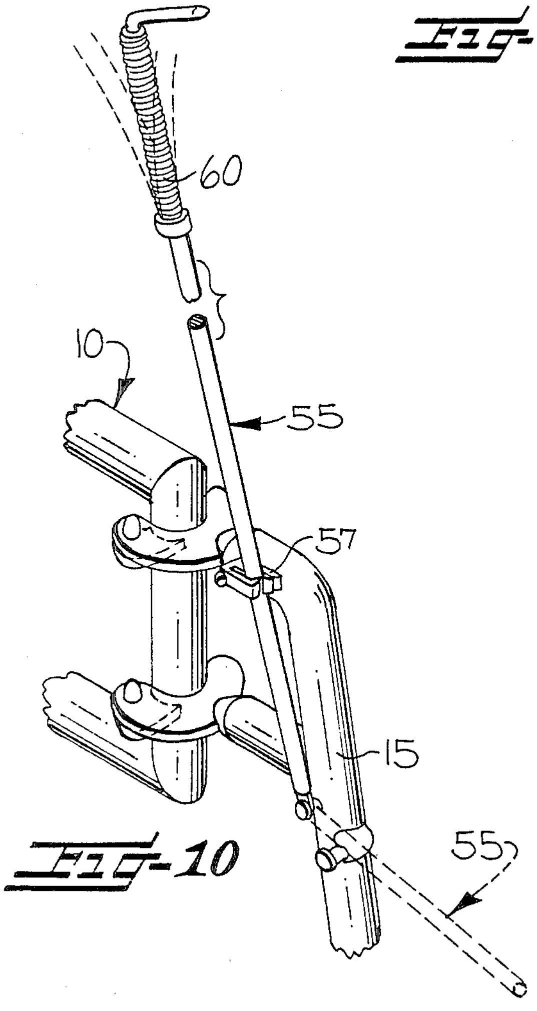
FIG. 10 is a fragmentary isometric view looking in the direction of the arrow 10 in FIG. 5 and illustrating the manner in which the distance measuring member is attached to the wheelchair.

A pivoted telescoping distance measuring device is broadly indicated at 55 in FIGS. 5 and 10. The lower end portion of the measuring device 55 is pivotally supported on one of the foot support frame members 15. When the wheelchair is being used in the normal manner, the measuring device 55 is normally stored in a substantially vertical, out-of-the-way location, as shown in solid lines in FIGS. 5 and 10 and by means of a spring clip member 57 fixed on the foot support frame member 15. The upper end of the measuring device 55 is provided with a yieldable tip end, in the form of a coil spring 60, for purposes to be presently described.

Figure 8:
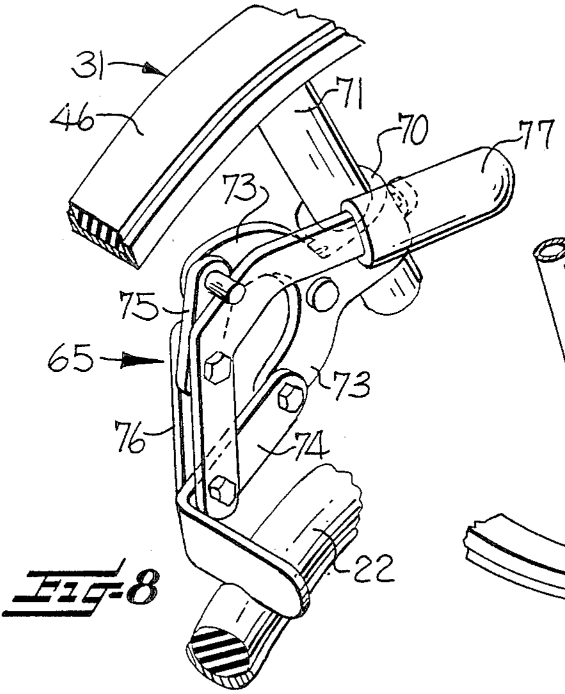
FIG. 8 is a fragmentary isometric view of the mechanism employed for drivingly attaching the spiral cam to the motive wheel of the wheelchair.

The control means operable by the occupant for selectively activating the normally inactive spiral cams 30, 31 also includes a combination brake-clutch means, broadly indicated at 65, and best shown in FIG. 8. The brake-clutch means 65 is provided for applying brakes to the drive wheels 22 when the wheelchair is being used in the normal operating mode, and for locking the spiral cams 30, 31 in position relative to the drive wheels 22 when the wheelchair is being used to ascend and descend a curb or the like. The combination brake-clutch means 65 includes a mounting hub 70 (FIG. 8) supported for vertical adjustment on the lower end portion of a support shaft 71, the upper end of which is suitably secured, as by welding, to the spiral cam 31. The hub 70 has bifurcated outwardly extending arms 73 with the lower arm pivotally supporting one end of an L-shaped brake pressure bar 74 which is movable into and out of locking engagement with the rubber tire of the main drive wheel 22. Upper and lower toggle links 75, 76 are pivotally connected at their outer ends to the brake pressure bar 74 and the upper arm 73 and at their inner ends to the end of an operating handle 77. The pivot pin connecting the upper toggle link 75 to the upper arm 73 extends outwardly and is enageable as a stop by the operating lever 77 so that the handle 77 may be used to selectively move the combination brake-clutch means 65 between the operative and inoperative positions, as desired.

Thus, the control means includes both the manually operable locking pins 34 and the brake-clutch means 65 associated with each of the spiral cams 30, 31. The control means is operated by the occupant for selectively activating the normally inactive spiral cams 30, 31 so that they are attached to the drive wheels 22 for rotation therewith when the wheelchair is to be raised to traverse an obstruction, such as a curb.

When the wheelchair is being used in the conventional mode, with the spiral cams 30, 31 being maintained in inactive position by the locking pins 34, the operating handles 77 may be moved to the positions shown in FIG. 8 to thereby prevent rotation of the main drive wheels 22 and maintain the wheelchair in a fixed position. On the other hand, when the wheelchair is being used to ascend or descend a curb, in a manner to be presently described, the combination brake-clutch means 65 is used to lock the spiral cams 30, 31 to the corresponding drive wheels 22 so that they rotate with rotation of the drive wheels and form a rolling ramp for gradually raising and lowering the wheelchair.

Figure 1:
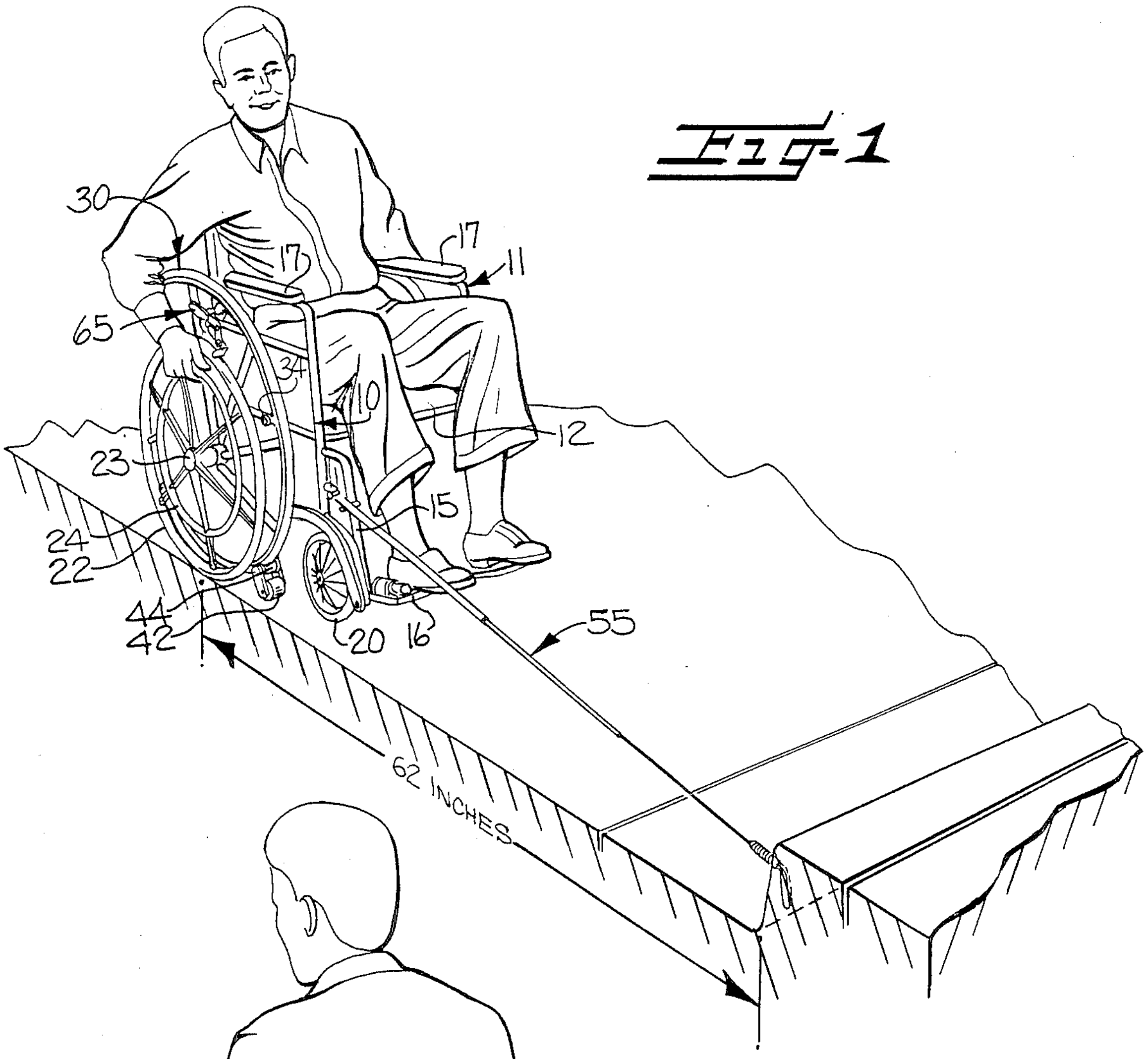
FIG. 1 is a perspective front view of the wheelchair of the present invention positioned the proper distance from a curb to be ascended thereby.
Figure 2:
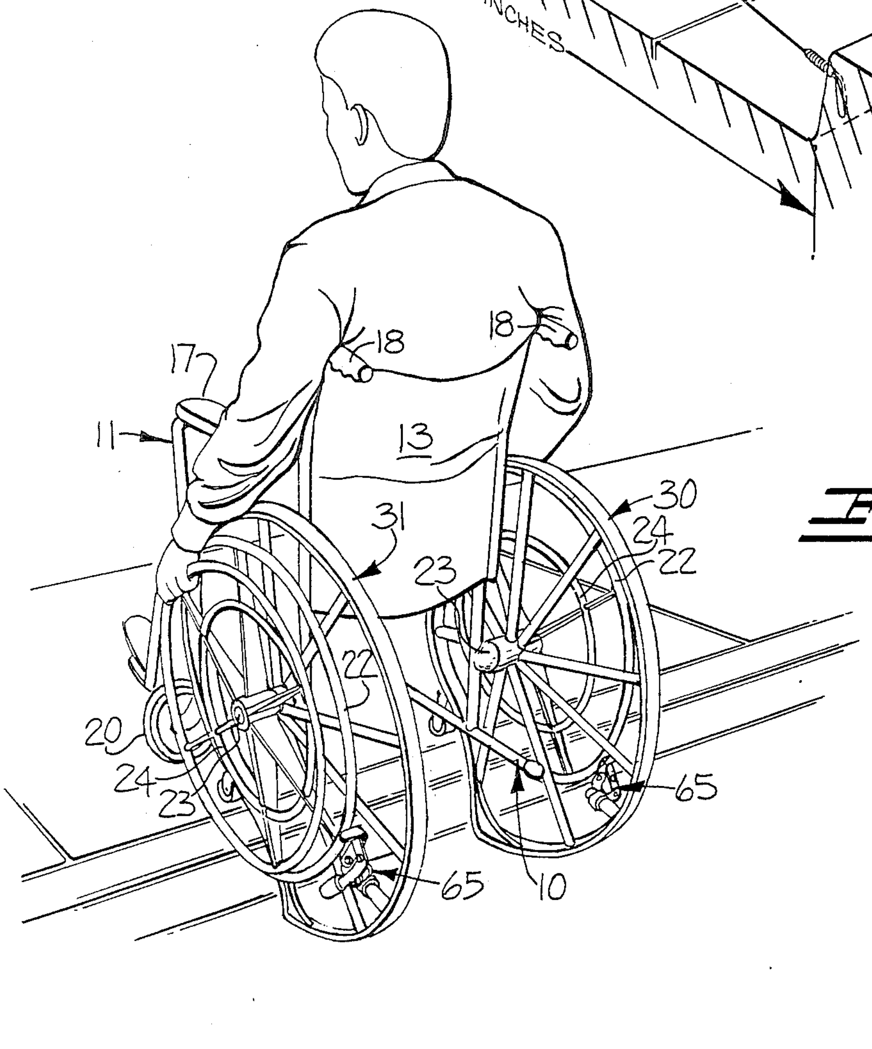
FIG. 2 is a perspective rear view of the wheelchair when it has been lifted by the spiral cams to the same level as the curb.

In order to ascend a curb, as illustrated in FIG. 1, the wheelchair occupant extends the telescoping measuring device 55 and swings the outer end down to the level to engage the curb. The wheelchair is then maneuvered until it is distanced the proper distance, in this case 62 inches, from the curb to be ascended, as illustrated in FIG. 1, with the outer end of the measuring device 55 touching the curb. The occupant of the chair then moves the levers 77 on opposite sides to the locking position so that the brake pressure bars 74 engage the rubber tired drive wheels 22, as shown in FIG. 8, to lock the spiral cams 30, 31 in fixed relationship to the drive wheels 22. The locking pins 34 are then moved outwardly on opposite sides of the wheelchair, to the dotted line position shown in FIG. 11, so that the spiral cams 30, 31 rotate with forward or clockwise rotation of the drive wheels 22 by the operator or occupant imparting rotation to the hand rails 24.

With forward rotation of the drive wheels 22, the spiral cams 30, 31 first engage and begin lowering the cam following rollers 44 as the wheelchair moves toward the curb so that the lifting arms 41 begin to raise the casters 20 from the surface of the roadway. As the portion of the spiral cams 30, 31 engages the roadway, the drive wheels 22 are raised upwardly, with forward motion of the wheelchair, as schematically illustrated in FIG. 7, so that by the time the wheelchair has moved a distance of approximately 20 inches toward the curb, both the casters 20 and the drive wheels 22 are raised a distance of approximately two inches off of the pavement and the wheelchair is in a substantially level horizontal position.

The length of the radius of the spiral cams 30, 31 continues to increase with forward motion of the drive wheels 22 so that the wheelchair, including both the drive wheels 22 and the casters 20, is gradually raised upwardly above the surface of the roadway. As illustrated in FIG. 7, by the time the wheelchair has moved a distance of approximately 40 inches toward the curb, the drive wheels 22 and the casters 20 are approximately four inches above the surface of the roadway and the wheelchair is still in a substantially horizontal or level condition. As the wheelchair is moved onto the raised curb, as shown on the right-hand portion of FIG. 3, the longest radius of the spiral cams 30, 31 is in engagement with the pavement and the drive wheels 22 are beginning to move onto the upper portion of the raised curb while the casters 20 have already been positioned thereon, having been lifted by the cam following rollers 44 of the lifting arm 41 engaging the longest radius of the spiral cams 30, 31, as shown at the 60-inch mark from the initial start position in the lower portion of FIG. 7.

When both the casters 20 and the drive wheels 22 are up on the upper raised curb, further rotation of the drive wheels will bring the spiral cams 30, 31 back to the storage position, that is, the position shown in FIG. 5. At this point, the occupant locks the spiral cams 30, 31 to the side frames 10, 11 by moving the locking pins 34 inwardly, to the position shown in solid lines in FIG. 11. The occupant then rleases the brake lever 77 so that the drive wheels 22 will operate free and independent of the spiral cams 30, 31 and the wheelchair can be operated in the usual manner.

Figure 7:
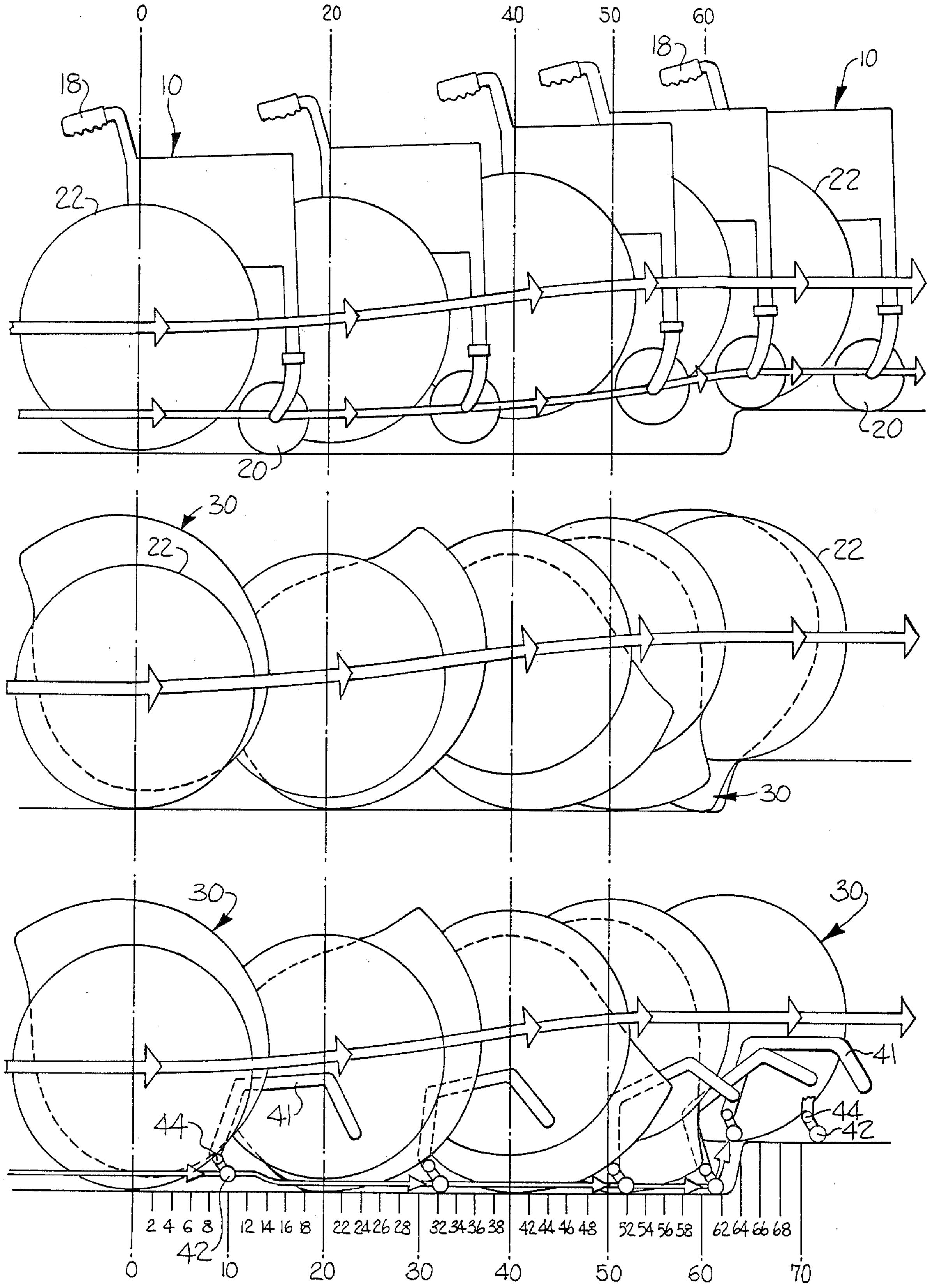
FIG. 7 schematically illustrates the manner in which the wheelchair is progressively lifted as the wheelchair is moved toward and up onto the curb.

Thus, as schematically illustrated in FIGS. 3 and 7, the spiral cams 30, 31 act as rolling ramps to progressively and gradually raise the wheelchair as it is moved forward by the occupant toward the curb to be ascended. The wheelchair is maintained in a substantially horizontal and level condition as it is raised upwardly onto the curb and the gradual raising of the wheelchair by the spiral cams 30, 31 can be carried out by an occupant in the wheelchair without requiring unusual shoulder and arm strength.

With the spiral cams 30, 31 positioned adjacent the drive wheels 22 in the manner shown in the embodiment of FIGS. 1–11, the wheelchair occupant can descend a curb by maneuvering the drive wheels 22 into a position where they are close to the curb to be descended with the wheelchair facing rearwardly, as schematically illustrated in FIG. 4. The wheelchair is then moved forwardly away from the curb a distance of approximately one-quarter to one-third rotation of the drive wheels 22 so that the wheelchair is positioned in the manner shown in the right-hand portion of FIG. 4. The wheelchair occupant then moves the brake levers 77 into engaged position at opposite sides of the wheelchair to lock the spiral cams 30, 31 to the drive wheels 22 and then releases the locking pins 34 at each side of the wheelchair.

With rearward rotation of the drive wheels 22, the spiral cams 30, 31 will move to the position shown in the left-hand portion of FIG. 4 so that the longest radius of each of the spiral cams 30, 31 engages the lower roadway. With further reverse movement of the drive wheels 22 by the occupant, the wheelchair will be gradually lowered down to the level of the roadway, in the reverse direction from the schematic illustration of the manner in which the wheelchair is raised in FIG. 7. After the drive wheels have been lowered to engage the roadway, the occupant then locks the spiral cams 30, 31 in position against the opposite side frames 10, 11 by moving the locking pins 34 inwardly and then releases the brake levers 77 so that the wheelchair can be operated in the usual manner.

THE EMBODIMENT OF FIGS. 12–17

Figure 13:
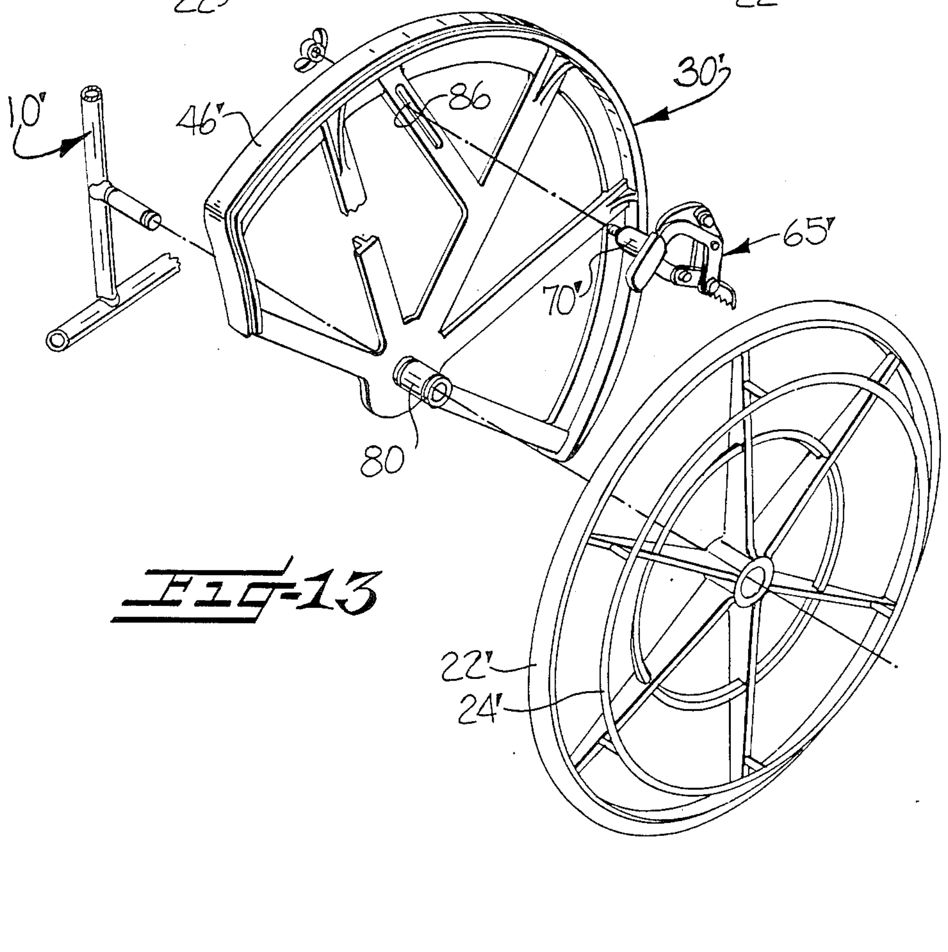
FIG. 13 is an exploded isometric view illustrating the manner in which the spiral cam is supported to overlie the main motive wheel of the wheelchair of FIG. 12.
Figure 14:
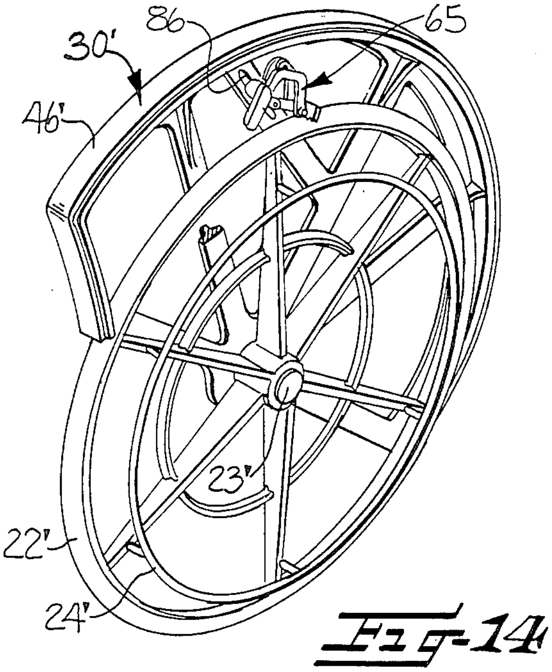
FIG. 14 is a view similar to FIG. 13 but showing the spiral cam in assembled condition and in overlying relationship with the main motive wheel.
Figure 15:
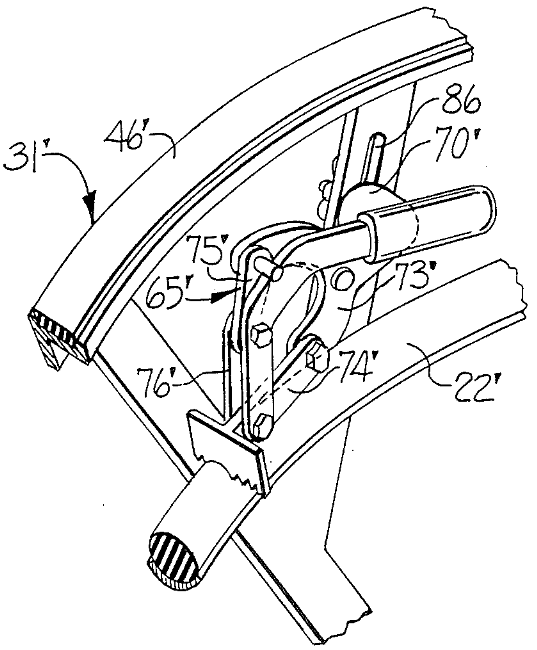
FIG. 15 is an enlarged fragmentary isometric view illustrating the manner in which the spiral cam is attached to the main motive wheel for movement therewith when in operative position.
Figure 16:
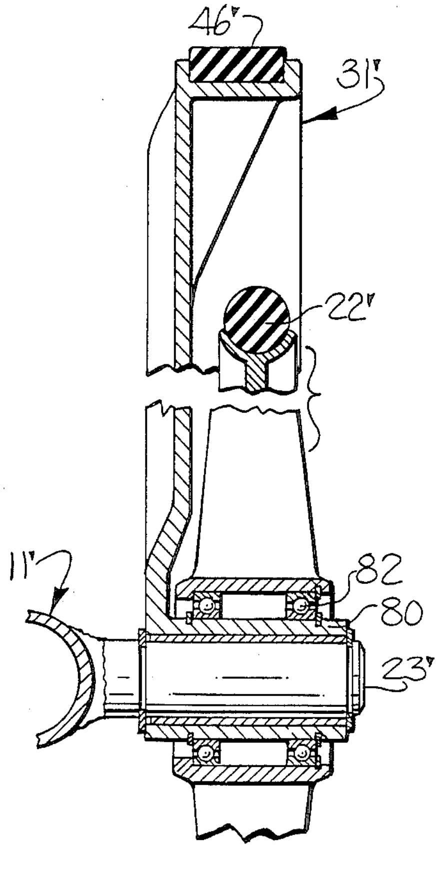
FIG. 16 is an enlarged fragmentary vertical sectional view through the upper portion of the main motive wheel and the spiral cam and illustrating the manner in which they are supported for rotational movement on the wheelchair.
Figure 17:
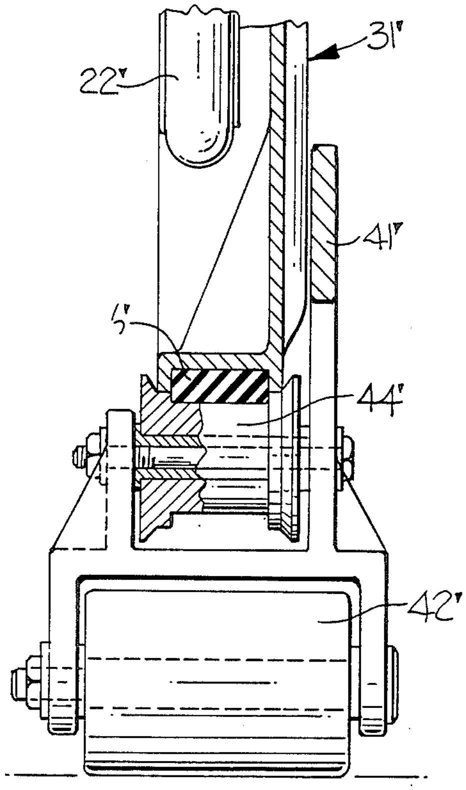
FIG. 17 is an enlarged vertical sectional view illustrating the manner in which the lifting arm's cam following roller engages the spiral cam and raises the front portion of the wheelchair as the wheelchair approaches the curb.

The embodiment of the wheelchair of FIGS. 12–17 is substantially the same as the embodiment of FIGS. 1–11 except that the spiral cams are designed to overlie the main drive wheels so that the overall width of the wheelchair is not increased over the conventional width of a self-propelled and collapsible wheelchair. The parts of the wheelchair of FIGS. 12–17 which are functionally identical to the corresponding parts of the wheelchair of FIGS. 1–11 will bear the same reference characters with the prime notation added. As best shown in FIG. 13, the spiral cams 30′, 31′ are manufactured with relatively flat spokes extending inwardly from an outer rim on which the rubber tire 46′ is mounted and a pivot hub 80 extends outwardly therefrom and is supported for pivotal movement on the stub axle shaft 23′ (FIG. 16).

The drive wheel 22′ is rotatably supported on the hub 80 by bearings 82 and the outer rim of the spiral cam 30′ overlies the tire of the drive wheel 22′, as shown in FIG. 16. The inner lower free end of the lifting arm 41′ is adapted to rotatably support a cam following roller 44′ (FIG. 17) which is maintained in engagement with the spiral cam 30′ and also supports a ground engaging single roller 42′ for rotation beneath the cam following roller 44′. The combination brake-clutch means 65′ (FIG. 15) includes a hub portion 70′ which is supported for adjustment in a slot 86. The brake pressure bar 74′ is T-shaped so that the outer end portion is adapted to move into and out of engagement with the rubber tire on the drive wheel 22′ when the actuating lever 77′ is moved between operative and inoperative positions.

The operation of the embodiment of the wheelchair of FIGS. 12–17 is identical to the operation of the wheelchair of the embodiment of FIGS. 1–11. The only difference is the configuration of the spiral cams 30′, 31′ so that the operating rims thereof overlie the drive wheels 22′ and thereby permit the wheelchair to be of substantially the same width as a conventional wheelchair without the ascending and descending feature of the present invention added thereto.

THE EMBODIMENT OF FIGS. 18–21

The embodiment of the wheelchair of FIGS. 18–21 is substantially the same as the wheelchair of the other two embodiments and corresponding parts will be designated by the same reference characters with the double prime notation added. However, in the embodiment of FIGS. 18–21 the small casters 20″ are positioned toward the rear of the wheelchair while the main drive wheels 22″ are positioned toward the front of the wheelchair and the spiral cams 30″, 31″ are facing in the opposite direction so that the wheelchair descends a curb when moving in a forward direction and ascends a curb when being moved in a rearward direction. The maximum radius, indicated by the dash-dot line R″ in FIG. 20, normally extends upwardly and forwardly so that the wheelchair is progressively raised as it is moved rearwardly toward the curb.

Figure 18:
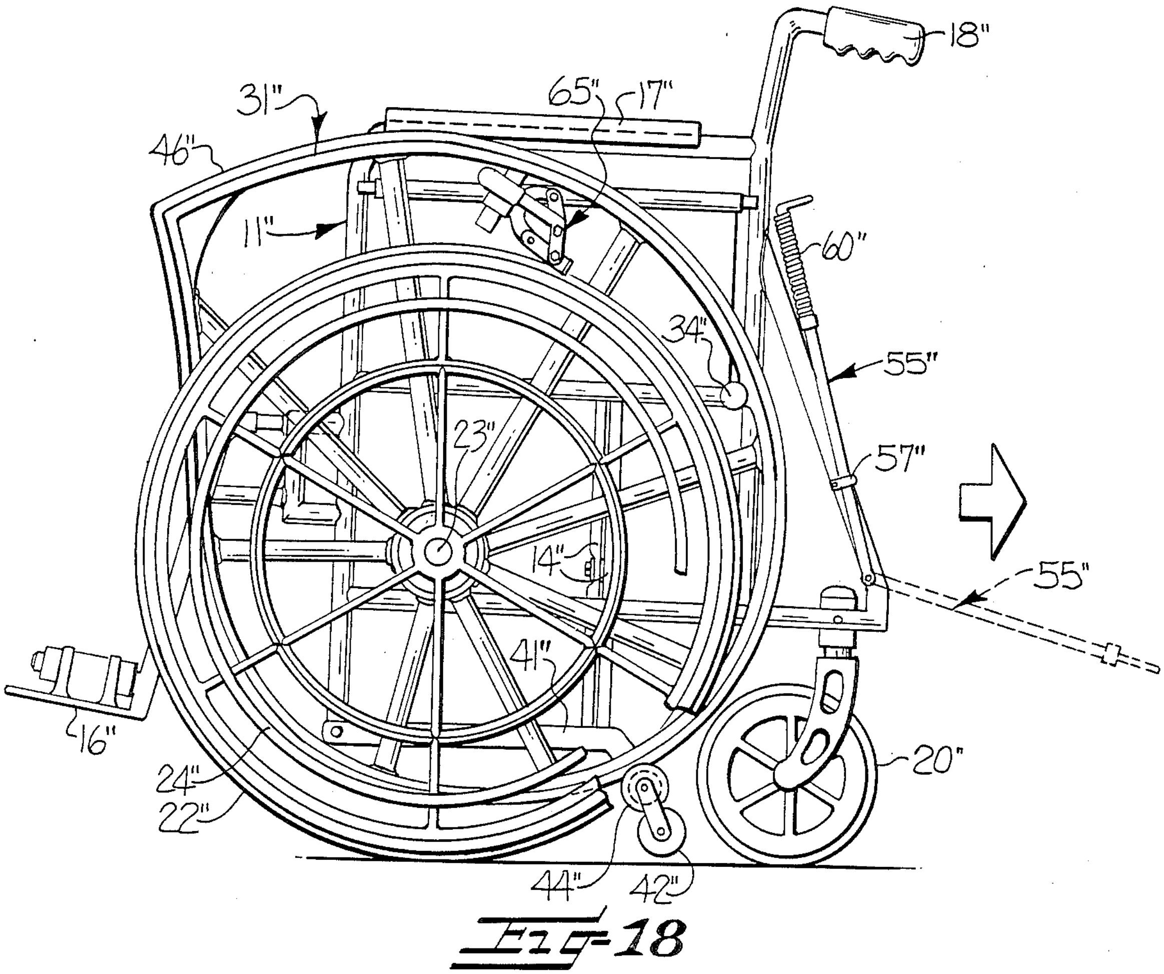
FIG. 18 is a side elevational view of a modified form of wheelchair with the casters being positioned at the rear of the wheelchair.
Figure 19:
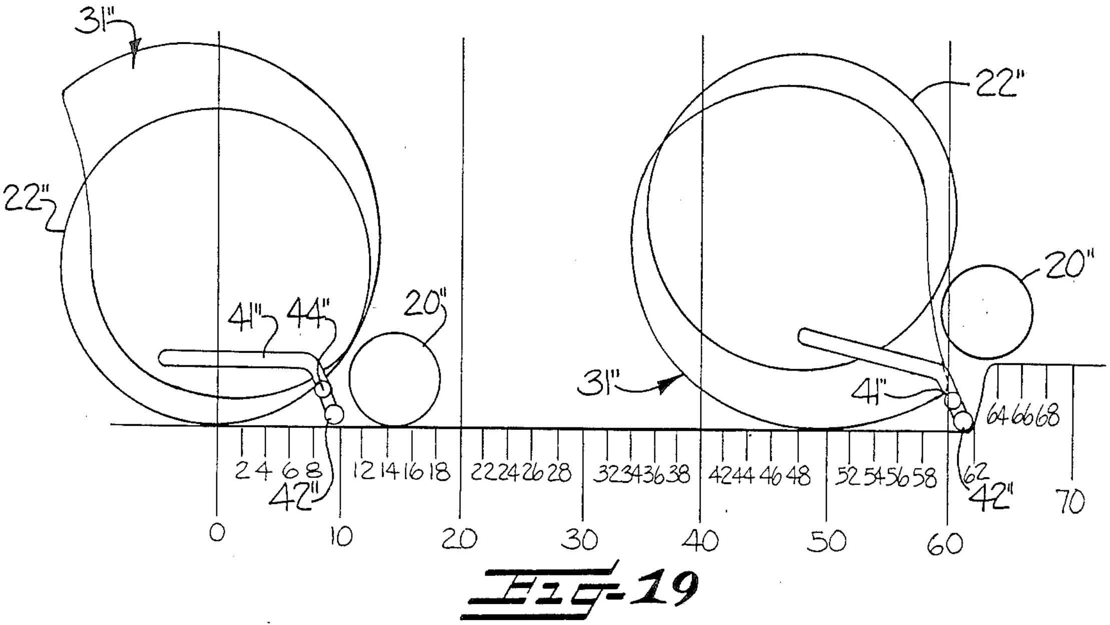
FIG. 19 is a schematic view illustrating the manner in which the modified form of wheelchair shown in FIG. 18 is positioned the required distance from a curb to be ascended and the manner in which the wheelchair is lifted as it moves rearwardly and onto the curb.

In FIG. 18, it will be noted that the measuring device 55″ has been positioned for pivoting movement on the rear portion of the wheelchair frame so that the proper distance from the curb can be determined by the occupant extending and then swinging the measuring device 55″ downwardly to substantially a horizontal position with the wheelchair in a position rearwardly facing the curb to be ascended. Once the proper distance has been determined, the brake-clutch means 65″ is operated to lock the spiral cams 30″, 31″ to the corresponding drive wheels 22″ and the locking pins 34″ are moved to the inoperative or outermost position. As rotation in a rearward direction is imparted to the drive wheels 22″ by the occupant, as illustrated schematically in FIGS. 19 and 20, the spiral cams 30″, 31″ move into engagement with the cam following roller 44″ on the lifting arms 41″ to begin lifting the rear casters 20″ and then the main drive wheels 22″ are lifted in a gradual and progressive manner until the wheelchair is moved upwardly in a gradual and substantially horizontal and level condition onto the raised curb, as schematically illustrated in FIG. 20. After the wheelchair is positioned on the raised curb, the occupant can lock the spiral cams 30″, 31″ in an inactive or inoperative position by the locking pins 34″ and then release the combination brake-clutch means 65″ so that the wheelchair can then be used in the normal manner.

In order to descend from a raised curb surface to a lower roadway surface, as schematically illustrated in FIG. 21, the occupant positions the wheelchair in the position illustrated at the right-hand portion of FIG. 21, and engages the combination brake-clutch means 65″ and then releases the locking pins 34″. With forward rotation of the drive wheels 22″ by the occupant, the longest radius of the spiral cams 30″, 31″ will first engage the lower roadway surface, as illustrated in the right-hand portion of FIG. 21. Further forward rotation of the drive wheels 22″ will cause the wheelchair to be gradually lowered in a progressive manner and in a substantially horizontal and level condition as further forward rotation is imparted to the drive wheels 22″ by the occupant. The descending of the wheelchair in a forward direction is the same as that illustrated in FIG. 19 except in the reverse direction. When the drive wheels 22″ engage the lower roadway, after having descended from the elevated curb, the occupant then engages the locking pins 34″ and releases the combination brake-clutch means 75″ to maintain the spiral cams 30″, 31″ in the inactive or inoperative position so that the wheelchair can then be operated in the normal manner.

In all embodiments of the wheelchair illustrated, the spiral cams are selectively attachable and detachable from driving engagement with the main drive wheels and when attached to the drive wheels they act as rolling ramps to raise and lower the wheelchair to permit the same to ascend and descend curbs and the like while the wheelchair is maintained in substantially horizontal or level condition. The spiral cams can be positioned relative to the drive wheels to permit the wheelchair to ascend a curb when being moved in the forward direction, as illustrated in FIG. 3, or to ascend a curb when being moved in a rearward direction, as illustrated in FIG. 20. The addition of the curb ascending and descending mechanism to the wheelchair does not substantially increase the weight, is very simple and may be installed at little additional cost, and does not change the basic operation of the wheelchair or its ability to maneuver and move in the normal manner.

In the drawings and specification there have been set forth the best modes presently contemplated for the practice of the present invention, and although specific terms are employed, they are used in a generic and descriptive sense only and not for purposes of limitation, the scope of the invention being defined in the claims.

That which is claimed is:

1. A wheelchair adapted to traverse an obstruction such as a curb, said wheelchair including an occupant supporting seat, a frame supporting said seat, pairs of front and rear surface engaging wheels rotatably supported on said frame and supporting said seat for movement along a surface, one of said pairs of wheels being considerably larger than the other pair, normally inactive spiral cam means operatively associated with said larger wheels and rotatable about a common axis with said larger wheels for progressively raising said wheelchair up to the level of the obstruction in response to rotational movement of said larger wheels in one direction and for progressively lowering said wheelchair down from the obstruction in response to rotational movement of said larger wheels in the other direction, and control means operable by the occupant for selectively activating said normally inactive spiral cam means.

2. A wheelchair according to claim 1 wherein said larger pair of surface engaging wheels comprises drive wheels, and including axles carried by said frame and supporting said drive wheels for rotation thereon, said drive wheels being rotatable to impart movement to said wheelchair, and wherein said spiral cam means comprises a spiral cam wheel supported on said axles for rotational movement and adjacent each of said drive wheels, said spiral cam wheel including an outer surface engaging periphery with a gradually increasing radius, said gradually increasing radius encompassing substantially one-half the periphery of said drive wheel and terminating at a maximum radius extending outwardly beyond the outer diameter of said drive wheel an amount approximating the height of the curb to be traversed.

3. A wheelchair according to claim 1 wherein said control means comprises locking means associated with each of said spiral cam means and being operable to fix said spiral cam means to said frame, thereby preventing rotation thereof during normal operation of said wheelchair.

4. A wheelchair according to claim 3 wherein said locking means is also operable to release said spiral cam means from fixed relationship with said frame when using said wheelchair to traverse an obstruction such as a curb.

5. A wheelchair according to claim 1 wherein said control means comprises manually operable brake-clutch means associated with each of said drive wheels and said corresponding spiral cam means, said brake-clutch means being selectively operable to permit free rotation of said drive wheels during normal operation of said wheelchair, being operable to prevent raising movement of said wheelchair when said locking means maintains said spiral cam means in fixed position on said frame, and being operable to fix said spiral cam means to said drive wheels for rotation therewith when said wheelchair is to be raised to traverse an obstruction such as a curb.

6. A wheelchair according to claim 2 wherein the maximum radius at the terminating end of each of said spiral cam wheels normally extends upwardly and rearwardly so that the wheelchair is progressively raised as the wheelchair is moved forwardly toward the curb.

7. A wheelchair according to claim 2 wherein the maximum radius at the terminating end of each of said spiral cam wheels normally extends upwardly and forwardly so that the wheelchair is progressively raised as the wheelchair is moved in a rearward direction to traverse the curb.

8. A wheelchair according to claim 2 wherein said other pair of said surface engaging wheels comprises casters having a relatively small diameter, and including a lifting arm pivotally supported at one end on opposite sides of said frame, a cam following roller rotatably supported adjacent the opposite end of each of said lifting arms and being engageable by said corresponding spiral cam wheels when rotated to lift said casters as said wheelchair is moved toward the curb.

9. A wheelchair according to claim 8 including surface engaging wheel means supported on said other end of each of said lifting arms and beneath said corresponding cam following rollers.

10. A wheelchair according to claim 8 including resilient means in engagement with each of said lifting levers for maintaining said cam following rollers in engagement with said spiral cam wheels.

11. A wheelchair according to claim 8 wherein said casters are supported by said frame in a position forwardly of said drive wheels.

12. A wheelchair according to claim 8 wherein said casters are supported by said frame in a position rearwardly of said drive wheels.

13. A wheelchair according to claim 5 wherein said brake-clutch comprises an operating lever, a brake pressure bar pivotally connected to said spiral cam wheel and engageable with said drive wheels, and toggle linkage means connecting said operating lever to said brake lever and being operable by said operating lever for selectively moving said brake lever between operative and inoperative positions.

14. A wheelchair according to claim 4 wherein said locking means comprises a locking pin supported for inward and outward sliding movement in each of said spiral cam wheels, and means supported by said frame for receiving the inner ends of said locking pins when moved inwardly to maintain said spiral cam wheels in a fixed position relative to said frame when said locking pins are moved to the innermost locking position.

15. A wheelchair according to claim 1 including telescoping distance measuring means carried by said frame and being movable between operative and inoperative positions for determining the correct distance from a curb to be ascended by said wheelchair.

16. A wheelchair according to claim 2 wherein said outer surface engaging periphery of each of said spiral cam wheels is normally positioned in overlying relationship with a portion of the corresponding drive wheels.

17. A wheelchair adapted to traverse an obstruction such as a curb, said wheelchair including an occupant supporting seat, a frame supporting said seat, pairs of front and rear surface engaging wheels rotatably supported on said frame and supporting said seat for movement along a surface, one of said pairs of wheels being considerably larger than the other pair, normally inactive spiral cam means operatively associated with said larger wheels and rotatable about a common axis with said larger wheels for progressively raising said wheelchair up to the level of the obstruction in response to rotational movement of said larger wheels in one direction and for progressively lowering said wheelchair down from the obstruction in response to rotational movement of said larger wheels in the other direction, said spiral cam means including an outer surface engaging periphery with a gradually increasing radius and terminating at a maximum radius extending outwardly beyond the outer diameter of said larger drive wheel an amount approximating the height of the obstruction to be traversed, said maximum radius at the terminating end of each of said spiral cam means normally extending upwardly and rearwardly so that the wheelchair is progressively raised as the wheelchair is moved forwardly toward the obstruction, and control means operable by the occupant for selectively activating said normally inactive spiral cam means.

18. A wheelchair adapted to traverse an obstruction such as a curb, said wheelchair including an occupant supporting seat, a frame supporting said seat, pairs of front and rear surface engaging wheels rotatably supported on said frame and supporting said seat for movement along a surface, one of said pairs of wheels being considerably larger than the other pair, normally inactive spiral cam means operatively associated with said larger wheels and rotatable about a common axis with said larger wheels for progressively raising said wheelchair up to the level of the obstruction in response to rotational movement of said larger wheels in one direction and for progressively lowering said wheelchair down from the obstruction in response to rotational movement of said larger wheels in the other direction, said spiral cam means including an outer surface engaging periphery with a gradually increasing radius and terminating at a maximum radius extending outwardly beyond the outer diameter of said larger drive wheel an amount approximating the height of the obstruction to be traversed, said maximum radius at the terminating end of each of said spiral cam means normally extending upwardly and forwardly so that the wheelchair is progressively raised as the wheelchair is moved rearwardly toward the obstruction, and control means operable by the occupant for selectively activating said normally inactive spiral cam means.

* * * * *